United States Patent [19]
Michael et al.

[11] Patent Number: 5,322,827
[45] Date of Patent: Jun. 21, 1994

[54] BURNED REFRACTORIES WITH LOW SOLUBLE CHROMIUM

[75] Inventors: David J. Michael, White Oak; Albert L. Renkey, Bridgeville; Kenneth A. McGowan, N. Huntingdon, all of Pa.

[73] Assignee: Indresco, Inc., Dallas, Tex.

[21] Appl. No.: 8,767

[22] Filed: Jan. 22, 1993

Related U.S. Application Data

[63] Continuation of Ser. No. 722,496, Jun. 27, 1991, abandoned.

[51] Int. Cl.$^5$ ............................................. C04B 35/12
[52] U.S. Cl. ................................. 501/132; 501/114; 501/115; 501/117
[58] Field of Search ............... 501/114, 115, 117, 132

[56] References Cited

U.S. PATENT DOCUMENTS

| | | | |
|---|---|---|---|
| 3,309,209 | 3/1967 | Martinet | 501/114 X |
| 3,522,065 | 7/1970 | Herron | 501/114 |
| 3,528,830 | 9/1970 | Davies | 501/114 X |
| 3,751,273 | 8/1973 | Nelson et al. | 501/115 |

FOREIGN PATENT DOCUMENTS

| | | | |
|---|---|---|---|
| 0446474 | 1/1948 | Canada | 501/114 |
| 2718370 | 11/1977 | Fed. Rep. of Germany . | |
| 2554739 | 5/1985 | France . | |
| 53-020042 | 6/1978 | Japan . | |
| 58-045174 | 3/1983 | Japan . | |
| 798077 | 1/1981 | U.S.S.R. . | |
| 1085961 | 4/1984 | U.S.S.R. | 501/117 |
| 873765 | 7/1961 | United Kingdom . | |
| 1089354 | 11/1967 | United Kingdom . | |
| 1573316 | 8/1980 | United Kingdom . | |

*Primary Examiner*—Karl Group
*Attorney, Agent, or Firm*—Jones, Day, Reavis & Pogue

[57] ABSTRACT

A burned chrome-containing refractory and method which provides a refractory having less than 5 ppm total soluble chromium. Such product is obtained by adding to the starting mix less than 10 wt. % (often less than 3 wt. %) zirconia, silica, zircon, or molybdic oxide either individually or in combination.

37 Claims, 1 Drawing Sheet

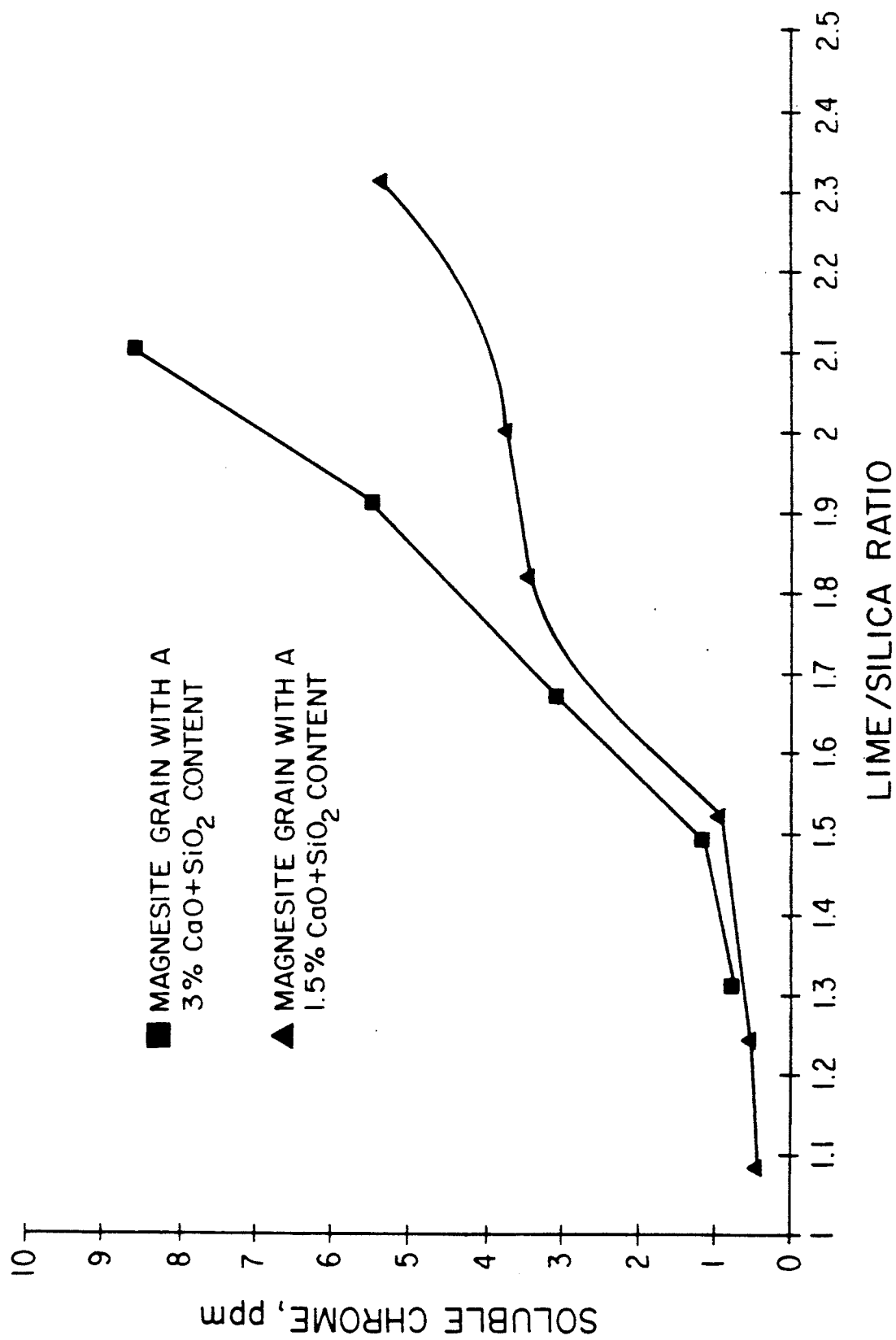

BURNED REFRACTORIES WITH LOW SOLUBLE CHROMIUM

This application is a continuation application of application Ser. No. 07/722,496, filed Jun. 27, 1991, now abandoned.

BACKGROUND OF THE INVENTION

This invention relates to chromium containing refractories and, more particularly, it concerns an improved burned refractory with low levels of soluble chromium.

Chromium in its various oxide forms is a useful constituent of refractories because of its high melting point and its relative inertness when in contact with corrosive slags, gases, and molten metals. The main forms of chromium used in refractories are the mineral chromite—a complex oxide consisting of about 30–60% $Cr_2O_3$—and pigment-grade chromium oxide ($Cr_2O_3$). Under certain conditions, the acid form of chromium, chromic acid ($CrO_3$), can form from these materials. After use, routine disposal of these refractories is of concern since $CrO_3$ (chromium VI) can be dissolved by water. Simple leaching of used chrome-bearing refractories by rain water or ground water may dissolve $CrO_3$ present in the refractory.

The U.S. Environmental Protection Agency has issued test methods to determine the level of water-soluble chromium from various materials and has specified a current (Yr. 1990) maximum allowable level of total water-soluble chromium (all valence states of chromium) to be no more than 5 mg/l (or 5 ppm). The test methods used to determine soluble chromium have evolved from the earliest method, the EP Method (Extraction Procedure), to the present method, the TCLP Method (Toxicity Characteristic Leaching Procedure—Method 1311).

Since the EPA guidelines were announced, producers and consumers of chrome-bearing materials have been involved with determining the level of soluble chromium in their products. It is now apparent that different products containing similar levels of total chromium can differ in their soluble chromium levels. Therefore, a good correlation between total chromium and soluble chromium is not immediately apparent.

In light of the foregoing, there is a need for an improved refractory and method having a decreased level of soluble chromium, and in particular, a burned refractory having a level of soluble chromium reduced to below 5 ppm.

SUMMARY OF THE INVENTION

In accordance with the present invention, it has been unexpectedly discovered that minor additions of fine zirconia, silica, zircon and/or molybdic oxide to burned chrome-containing refractories are effective in lowering the soluble chromium level of these compositions to acceptable values. This discovery is noteworthy, since it allows control of soluble chromium in a variety of chrome-bearing products. For example, products containing unacceptable levels of soluble chromium may now be made to contain low, acceptable levels of soluble chromium.

In accordance with an exemplary embodiment of the present invention, a burned 60% magnesite/40% chrome ore brick, which otherwise could have soluble chrome levels well in excess of 5 ppm, has a reduced soluble chromium level below the mandated 5 ppm maximum by either adding less than 2 wt. % zirconia, less than 0.5 wt. % silica, or less than 5 wt. % molybdic oxide. These amounts are meant to be illustrative rather than restrictive since it is readily apparent that compositions with higher amounts of soluble chromium may require larger amounts of these additives in order to reduce the level of soluble chromium to acceptable levels.

Accordingly, a principal object of the present invention is to provide a burned refractory with low soluble chromium. Another and more specific object of the invention is the provision of a method of reducing the soluble chromium levels of burned refractories. Other objects and further scope of applicability of the present invention will become apparent from the detailed description to follow taken in conjunction with the accompanying drawings and tables.

BRIEF DESCRIPTION OF THE DRAWINGS

FIG. 1 is a graphical representation of the influence of lime/silica ratio on soluble chromium.

DETAILED DESCRIPTION OF THE PREFERRED EMBODIMENT

Some commercially available magnesite-chrome bricks have levels of soluble chromium that exceed the EPA guideline of 5 ppm or less. In accordance with the present invention, it is possible to produce such a refractory with an acceptable level of soluble chromium by adding minor amounts of zirconia, silica, zircon and/or molybdio oxide to the base mix.

As shown in Table I, as little as 0.5% zirconia was quite effective in preventing formation of soluble chromium in a shape containing 1.3% $CaO+SiO_2$. An addition of 2% zirconia was sufficient to decrease the level of soluble chromium to under 1 ppm in a shape containing 2% $CaO+SiO_2$.

TABLE I

| | Effect of Zirconia Additions on Soluble Chromium | | | | | | | |
|---|---|---|---|---|---|---|---|---|
| Brick Type: | Burned 60/40 Magnesite-Chrome | | | | | | | Comparative Data |
| Mix: | A | B | C | D | E | F | G | 1990 EPA Guidelines |
| Lime Content of Mix, % | 0.94 | 0.91 | 0.87 | 1.38 | 1.38 | 1.45 | 1.40 | |
| Silica Content of Mix, % | 0.41 | 0.41 | 0.47 | 0.60 | 0.63 | 0.68 | 0.74 | |
| Lime/Silica Ratio of Mix: | 2.3 | 2.2 | 1.9 | 2.3 | 2.1 | 2.1 | 1.9 | |
| Total $Cr_2O_3$ Content of Mix: | 19.8 | 20.3 | 20.0 | 20.2 | 18.6 | 21.5 | 20.0 | |
| Addition to Mix: | | | | | | | | |
| Zirconia, −325 mesh, % | 0.0 | 0.5 | 1.0 | 0 | 0.5 | 1.0 | 2.0 | |
| TLCP Toxicity Test | | | | | | | | |
| Hexavalent Chromium (Cr), mg/l | 5.2 | 2.5 | 0.5 | 5.0 | 3.1 | 1.5 | 0.4 | |
| Total Chromium (Cr), mg/l | 5.4 | 2.5 | 0.6 | 8.3 | 3.4 | 1.7 | 0.4 | 5.0 (max.) |

Table II illustrates the effect of 0 to 3% fine zirconia in a burned 60/40 magnesite-chrome shape. Increasing the zirconia level to amounts greater than 1% has a dramatic effect on decreasing the level of soluble chromium. The relative fineness of the zirconia addition did not appear to be as important as the quantity of zirconia.

ing refractories such as chrome-magnesite shapes. It is conjectured that chromium 3+ (the most stable form of chromium) may convert to Cr 6+ in a high temperature environment, such as in a kiln. This conversion appears

TABLE II

| | Effect of Zirconia Additions on Soluble Chromium | | | | | |
|---|---|---|---|---|---|---|
| Brick Type: | Burned 60/40 Magnesite-Chrome | | | | | Comparative Data |
| Mix: | A | B | C | D | E | 1990 EPA Guideline |
| Lime Content of Mix, % | 0.9 | 0.9 | 0.8 | 0.8 | 0.8 | |
| Silica Content of Mix, % | 0.4 | 0.4 | 0.4 | 0.4 | 0.4 | |
| Lime/Silica Ratio of Mix: | 2.3 | 2.2 | 2.2 | 2.1 | 2.2 | |
| Total $Cr_2O_3$ Content of Mix, % | 17.9 | 21.0 | 19.0 | 20.2 | 18.7 | |
| Addition to Mix: | | | | | | |
| Zirconia, −44 microns | 0.0 | 1.0 | 2.0 | 3.0 | — | |
| Zirconia, −20 microns | — | — | — | — | 3.0 | |
| TLCP Toxicity Test | | | | | | |
| Hexavalent Chromium (Cr), mg/l | 4.8 | 0.4 | 0.2 | 0.2 | 0.3 | |
| Total Chromium (Cr), mg/l | 4.9 | 0.5 | 0.7 | 0.2 | 0.3 | 5.0 (max.) |

Table III shows the effect of fine silica additions to the base mix on the level of soluble chromium. Small additions of silica in amounts less than 0.5% were effective in significantly decreasing the amount of soluble chromium.

to be accelerated in the presence of an alkali or an alkaline earth compound.

The above examples clearly show that additions of zirconia in accordance with the present invention tend to decrease the amount of soluble chromium. Possibly,

TABLE III

| | Effect of Silica Additions on Soluble Chromium | | | | | | | | | | |
|---|---|---|---|---|---|---|---|---|---|---|---|
| Brick Type: | Burned 60/40 Magnesite-Chrome | | | | | | | | | | |
| Mix: | A | B | C | D | E | F | G | H | I | J | K |
| Lime Content of Mix, % | 1.53 | 1.47 | 1.42 | 1.45 | 1.53 | 0.97 | 0.94 | 0.91 | 0.93 | 0.93 | 0.91 |
| Silica Content of Mix, % | 0.73 | 0.77 | 0.85 | 0.97 | 1.17 | 0.42 | 0.47 | 0.50 | 0.61 | 0.75 | 0.84 |
| Lime/Silica Ratio of Mix: | 2.1 | 1.9 | 1.7 | 1.5 | 1.3 | 2.3 | 2.0 | 1.8 | 1.5 | 1.2 | 1.1 |
| Total $Cr_2O_3$ Content of Mix, % | 21.8 | 20.9 | 19.1 | 19.3 | 22.4 | 21.3 | 21.6 | 20.4 | 21.0 | 21.4 | 20.5 |
| Addition to Mix: | | | | | | | | | | | |
| Sub-Micron Silica | 0.0 | 0.1 | 0.2 | 0.35 | 0.5 | 0.0 | 0.05 | 0.1 | 0.2 | 0.35 | 0.5 |
| TLCP Toxicity Test | | | | | | | | | | | |
| Hexavalent Chromium (Cr), mg/l | 7.5 | 5.3 | 2.3 | 0.8 | 0.3 | 5.0 | 3.7 | 2.8 | 0.7 | 0.2 | 0.2 |
| Total Chromium (Cr), mg/l | 8.5 | 5.4 | 3.0 | 1.1 | 0.7 | 5.3 | 3.7 | 3.4 | 0.9 | 0.5 | 0.4 |

The influence of the lime/silica ratio on the level of soluble chromium is diagrammed in FIG. 1.

To determine if other oxides, such as molybdic oxide would produce a similar effect, additions of fine $MoO_3$ were made to the base mix ranging from 0 to 2% (Table IV). It is apparent that molybdic oxide was also effective in decreasing the level of soluble chromium. Two percent $MoO_3$ was required to decrease soluble chromium to less than 1 ppm.

zirconia has a stronger affinity for alkaline earth compounds (such as CaO) than chromium. Therefore, chromium in the presence of lime and zirconia tends to stay in the stable insoluble $Cr_2O_3$ form.

In accordance with another embodiment of the present invention, molybdic oxide was also found to be effective in decreasing the level of soluble chromium. $MoO_3$ appears to be effective because it is stable in the +6 state, it is chemically similar to $CrO_2$, and it may

TABLE IV

| | Effect of Molybdic Oxide ($MoO_3$) Additions on Soluble Chromium | | | | | | | |
|---|---|---|---|---|---|---|---|---|
| Brick Type: | Burned 60/40 Magnesite-Chrome | | | | | | | Comparative Data |
| Mix: | A | B | C | D | E | F | G | 1990 EPA Guidelines |
| Lime Content of Mix, % | 0.97 | 0.91 | 0.87 | 0.80 | 1.36 | 1.36 | 1.33 | |
| Silica Content of Mix, % | 0.42 | 0.44 | 0.42 | 0.40 | 0.68 | 0.68 | 0.68 | |
| Lime/Silica Ratio of Mix | 2.3 | 2.1 | 2.1 | 2.0 | 2.0 | 2.0 | 2.0 | |
| Total $Cr_2O_3$ Content of Mix, % | 21.3 | 20.0 | 19.4 | 19.2 | 19.8 | 20.8 | 20.8 | |
| Addition to Mix: | | | | | | | | |
| Molybdic Oxide, −325 mesh, % | 0.0 | 0.5 | 1.0 | 2.0 | 0.5 | 1.0 | 2.0 | |
| TLCP Toxicity Test | | | | | | | | |
| Hexavalent Chromium (Cr), mg/l | 5.2 | 3.0 | 1.3 | 0.4 | 5.5 | 2.6 | 0.5 | |
| Total Chromium (Cr), mg/l | 5.3 | 3.1 | 1.5 | 0.4 | 5.8 | 2.6 | 0.5 | 5.0 (max.) |

The above descriptions clearly illustrate the pronounced effect that minor additions of silica, zirconia, and molybdic oxide have on the soluble chromium content of fired magnesite-chrome refractories. Since both zirconia and silica work to lower soluble chromium levels, then zircon ($ZrO_2 \cdot SiO_2$) would also be effective at low levels. It is also obvious that these additions would be effective in other burned chrome-bearing refractories such as chrome-magnesite shapes.

have a higher affinity for alkalies or alkaline earth compounds than chromium.

Furthermore, additions of, for example, zirconia, silica and molybdic oxide can be used not only to lower the soluble chromium content of unused refractories, but are also useful in decreasing the soluble chromium content of used refractories. For example, used chromium-bearing refractories could be crushed, mixed with the aforementioned additives, and burned to reduce their soluble chromium content.

In accordance with an exemplary embodiment of the present invention, the soluble chromium content of used chromium containing refractories is lowered to less than 5 ppm total soluble chromium as defined by the Environmental Protection Agency's Test Method 1311 by crushing the used refractory, adding to the crushed material appropriate amounts of fine zirconia, silica, siliceous clay, siliceous additive, molybdic oxide, and/or zircon, blending and/or pressing the crushed material, and firing the material to a sufficient temperature to react to the above additions with soluble chromium compounds present in the used refractory. Although it is not required, the above-mentioned additions are preferably sized minus −65 mesh, and even more preferably minus −325 mesh.

Based upon these and other considerations, various forms of other elements theoretically could be used to decrease the levels of water-soluble chromium. These elements are: S, W, U, Ba, V, Nb, Ta, Fe, Eu, Mn, Tc, N, Cl, Se, Br, I, Re, Ru, Os, B, D, P, As, Sb, Te and Bi.

Thus, it will be appreciated that as a result of the present invention, a magnesite-chrome brick having acceptable levels of soluble chromium is provided by which the principal object and others are completely fulfilled. It is contemplated and will be apparent to those skilled in the art from the foregoing description and accompanying drawing and tables that variations and/or modifications of the disclosed embodiment may be made without departure from the invention. Accordingly, it is expressly intended that the foregoing description and accompanying drawing and tables are illustrative of a preferred embodiment only, not limiting, and that the true spirit and scope of the present invention be determined by reference to the appended claims.

What is claimed is:

1. A method of lowering the soluble chromium content of a burned chrome-containing refractory whose base mix has a lime/silica weight ratio greater than 1.1 to less than 5 ppm total soluble chromium as defined by the Environmental Protection Agency's Test Method 1311, comprising adding an addition of from about 0.5 to 10 wt. % fine zirconia to the base mix of said burned chrome-containing refractory.

2. The method of claim 1, wherein from about 0.5 to 2 wt. % zirconia is added.

3. The method of claim 1, wherein the addition used to obtain less than 5 ppm soluble chromium is sized −65 mesh.

4. The method of claim 3, wherein the addition is sized −325 mesh.

5. A method of lowering the soluble chromium content of a burned chrome-containing refractory whose base mix has a lime/silica weight ratio greater than 1.1 to less than 5 ppm total soluble chromium as defined by the Environmental Protection Agency's Test Method 1311, comprising adding an addition of from about 0.1 to 10 wt. % fine silica to the base mix of said burned chrome-containing refractory.

6. The method of claim 5, wherein from about 0.1 to 0.5 wt. % fine silica is added.

7. The method of claim 5, wherein the addition used to obtain less than 5 ppm soluble chromium is sized −65 mesh.

8. The method of claim 7, wherein the addition is size −325 mesh.

9. A method of lowering the soluble chromium content of a burned chrome-containing refractory whose base mix has a lime/silica weight ratio greater than 1.1 to less than 5 ppm total soluble chromium as defined by the Environmental Protection Agency's Test Method 1311, comprising adding an addition of from about 0.5 to 10 wt. % molybdic oxide ($MoO_3$) to the base mix of said burned chrome-containing refractory.

10. The method of claim 9, wherein from about 0.5 to 3 wt. % of molybdic oxide is added.

11. The method of claim 9, wherein the addition used to obtain less than 5 ppm soluble chromium is sized −65 mesh.

12. The method of claim 11, wherein the addition is sized −325 mesh.

13. A method of lowering the soluble chromium content of a burned chrome-containing refractory whose base mix has a lime/silica weight ratio greater than 1.1 to less than 5 ppm total soluble chromium as defined by the Environmental Protection Agency's Test Method 1311, comprising adding an addition of from about 0.5 to 10 wt. % zircon ($ZrO_2 \cdot SiO_2$) to the base mix of said burned chrome-containing refractory.

14. The method of claim 13, wherein from about 0.5 to 5 wt. % zircon is added.

15. The method of claim 13, wherein the addition used to obtain less than 5 ppm soluble chromium is sized −65 mesh.

16. The method of claim 15, wherein the addition is sized −325 mesh.

17. A method of lowering the soluble chromium content of a burned chrome-containing refractory whose base mix has a lime/silica weight ratio greater than 1.1 to less than 5 ppm total soluble chromium as defined by the Environmental Protection Agency's Test Method 1311, comprising adding an addition of at least two of fine zirconia, silica, zircon, or molybdic oxide in amounts from about 0.5 to 10 wt. % to the base mix of said burned chrome-containing refractory.

18. A burned chrome-containing refractory composition having a lime/silica weight ratio greater than 1.1 and having less than 5 ppm total soluble chromium as defined by the Environmental Protection Agency's Test Method 1311 made in accordance with the method of claim 17.

19. A burned chrome-containing refractory composition whose base mix has a lime/silica weight ratio greater than 1.1 and having less than 5 ppm total soluble chromium, wherein the burned chrome-containing refractory composition contains an addition of from about 0.5 to 10 wt. % fine zirconia to the base mix of the burned chrome-containing refractory composition.

20. The refractory composition of claim 19, wherein the addition is from about 0.5 to 2 wt. % fine zirconia.

21. The refractory composition of claim 19 wherein the addition used to obtain less than 5 ppm soluble chromium is sized −65 mesh.

22. The refractory composition of claim 21, wherein the addition is sized −325 mesh.

23. A burned chrome-containing refractory composition whose base mix has a lime/silica weight ratio greater than 1.1 and having less than 5 ppm total soluble chromium, wherein the burned chrome-containing refractory composition contains an addition of from about 0.5 to 10 wt. % molybdic oxide ($MoO_3$) to the base mix of the burned chrome-containing refractory composition.

24. The refractory composition of claim 23, wherein the addition is from about 0.5 wt. % to 3 wt. %.

25. The refractory composition of claim 23 wherein the addition used to obtain less than 5 ppm soluble chromium is sized −65 mesh.

26. The refractory composition of claim 25, wherein the addition is sized −325 mesh.

27. A burned magnesite-chrome or chrome-magnesite brick composition whose base mix has a lime/silica weight ratio greater than 1.1 in which the brick composition contains an addition of from about 0.5 to 10 wt. % zircon ($ZrO_2 \cdot SiO_2$) to the base mix of the brick composition.

28. The brick composition of claim 27, wherein the addition is from about 0.5 to 5 wt. %.

29. The refractory composition of claim 27 wherein the addition used to obtain less than 5 ppm soluble chromium is sized −65 mesh.

30. The refractory composition of claim 29, wherein the addition is sized −325 mesh.

31. A burned magnesite chrome or chrome-magnesite refractory composition whose base mix has a lime/silica weight ratio greater than 1.1 and having less than 5 ppm total soluble chromium wherein the refractory composition contains an addition of at least two of fine zirconia, zircon, or molybdic oxide in amounts from about 0.5 to 10 wt. % to the base mix of the refractory composition.

32. A burned chrome-containing refractory composition whose base mix has a lime/silica weight ratio greater than 1.1 and having less than 5 ppm total soluble chromium wherein the refractory composition contains an addition of fine zirconia and molybdic oxide in amounts from about 0.5 to 10 wt. % to the base mix of the refractory composition.

33. A method of lowering the soluble chromium content of used chromium-containing refractories whose base mix has a lime/silica weight ratio greater than 1.1 to less than 5 ppm total soluble chromium as defined by the Environmental Protection Agency's Test Method 1311 comprising the steps of crushing the used refractory, adding to the crushed material from about 0.1 to 10 wt. % fine zirconia, silica, molybdic oxide, or zircon, blending the crushed material and firing to a sufficient temperature to react the above additions with the soluble chromium compounds present in the used refractory.

34. The method of claim 33 wherein the additions are sized −65 mesh.

35. The method of claim 34 wherein the additions are sized −325 mesh.

36. A method of lowering the soluble chromium content of used chromium-containing refractories whose base mix has a lime/silica weight ratio greater than 1.1 to less than 5 ppm total soluble chromium as defined by the Environmental Protection Agency's Test Method 1311 comprising the steps of crushing the used refractory, adding to the crushed material from about 0.1 to 10 wt. % fine zirconia, silica, molybdic oxide, or zircon, pressing the crushed material and firing to a sufficient temperature to react the above additions with the soluble chromium compounds present in the used refractory.

37. A method of lowering the soluble chromium content of used chromium-containing refractories whose base mix has a lime/silica weight ratio greater than 1.1 to less than 5 ppm total soluble chromium as defined by the Environmental Protection Agency's Test Method 1311 comprising the steps of crushing the used refractory, adding to the crushed material from about 0.1 to 10 wt. % fine zirconia, silica, molybdic oxide, or zircon, blending and pressing the crushed material and firing to a sufficient temperature to react the above additions with the soluble chromium compounds present in the used refractory.

* * * * *